(12) United States Patent
Morin et al.

(10) Patent No.: US 11,842,011 B2
(45) Date of Patent: Dec. 12, 2023

(54) SYSTEM AND METHOD OF NOISE MITIGATION FOR IMPROVED STYLUS DETECTION

(71) Applicant: Apple Inc., Cupertino, CA (US)

(72) Inventors: Yonathan Morin, Palo Alto, CA (US); Apexit Shah, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 17/027,285

(22) Filed: Sep. 21, 2020

(65) Prior Publication Data

US 2021/0096723 A1    Apr. 1, 2021

Related U.S. Application Data

(60) Provisional application No. 62/907,228, filed on Sep. 27, 2019.

(51) Int. Cl.
*G06F 3/041* (2006.01)
*G06F 3/044* (2006.01)

(52) U.S. Cl.
CPC ...... *G06F 3/04182* (2019.05); *G06F 3/04162* (2019.05); *G06F 3/0441* (2019.05); *G06F 2203/04106* (2013.01)

(58) Field of Classification Search
CPC ............. G06F 3/04182; G06F 3/04162; G06F 3/0441; G06F 2203/04106
See application file for complete search history.

(56) References Cited

U.S. PATENT DOCUMENTS

| 9,372,575 | B2 | 6/2016 | Perski et al. | |
| 9,658,720 | B2 | 5/2017 | Kremin et al. | |
| 10,042,504 | B2 | 8/2018 | Post et al. | |
| 2005/0189154 | A1* | 9/2005 | Perski ................. | G06F 3/04182 178/18.06 |
| 2006/0012581 | A1* | 1/2006 | Haim ................ | G06F 3/041661 345/173 |

OTHER PUBLICATIONS

Bydder, Mark, "Solution of a Complex Least Squares Problem with Constrained Phase", Elsevier, Linear Algebra and its Applications, vol. 433, Issue 11-12, Dec. 30, 2010, pp. 1-4.

* cited by examiner

*Primary Examiner* — Stephen G Sherman
(74) *Attorney, Agent, or Firm* — Kubota & Basol LLP

(57) ABSTRACT

A touch screen or touch sensor panel can detect touches by conductive objects (e.g., fingers) and an active stylus and can mitigate noise in the sensed stylus signal from multiple noise sources. In some examples, the touch sensor panel includes a plurality of touch electrodes that can be used to sense touch data indicative of a proximate conductive object and to sense stylus data. The stylus data can include noise from one or more sources, for example. In some examples, the electronic device uses the touch data to determine a characteristic of one of the sources of noise and the stylus data to determine another characteristic of the source of noise and one or more characteristics of another source of noise. After modeling the noise, the electronic device can remove the noise from the stylus data to improve the accuracy of the stylus scan.

30 Claims, 9 Drawing Sheets

(1)

SYSTEM AND METHOD OF NOISE MITIGATION FOR IMPROVED STYLUS DETECTION

CROSS-REFERENCE TO RELATED APPLICATIONS

This application claims the benefit of U.S. Provisional Application No. 62/907,228, filed Sep. 27, 2019, the contents of which is hereby incorporated by reference in its entirety for all purposes.

FIELD OF THE DISCLOSURE

This relates generally to a touch screen or touch sensor panel configured to detect touches by conductive objects (e.g., fingers) and an active stylus and, more specifically, to mitigating noise in the sensed stylus signal from multiple noise sources.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, a touch sensor panel or touch screen is able to detect conductive objects (e.g., fingers) touching or hovering over the touch sensor panel or touch screen and an active stylus. The active stylus can generate an electrical signal that the touch sensor panel or touch screen is able to detect to determine the location of the stylus. In some examples, the sensed stylus signal can include noise from one or more sources, such as noise from a display (e.g., a display included in the touch screen or another display included in an electronic device having the touch sensor panel or touch screen) and noise generated by a conductive object (e.g., finger, palm, hand, arm, passive stylus, etc.) proximate to the touch screen or touch sensor panel while the stylus is being detected. Noise can interfere with detection of the stylus, including, in some situations, reducing the electronic device's ability to sense a stylus in contact with the touch screen or touch sensor panel.

BRIEF SUMMARY OF THE DISCLOSURE

This relates generally to a touch screen or touch sensor panel configured to detect touches by conductive objects (e.g., fingers) and an active stylus and, more specifically, to mitigating noise in the sensed stylus signal from multiple noise sources. In some examples, the touch sensor panel includes a plurality of touch electrodes that can be used to sense touch data indicative of a proximate conductive object (e.g., a user's finger, a passive stylus) and to sense stylus data (e.g., a signal produced by an active stylus). The stylus data can include noise from one or more sources, for example. In some examples, the electronic device uses the touch data to determine a characteristic of one of the sources of noise (e.g., a profile of noise generated by a proximate object capacitively coupling to the stylus) and the stylus data to determine another characteristic of the source of noise (e.g., a scalar gain of the noise generated by the proximate object) and one or more characteristics of another source of noise (e.g., scalar coefficients to model noise generated by a display using a predetermined function). After modeling the noise, the electronic device can remove the noise from the stylus data to improve the accuracy of the stylus scan.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to a touch screen or touch sensor panel configured to detect touches by conductive objects (e.g., fingers) and an active stylus and, more specifically, to mitigating noise in the sensed stylus signal from multiple noise sources. In some examples, the touch sensor panel includes a plurality of touch electrodes that can be used to sense touch data indicative of a proximate conductive object (e.g., a user's finger, a passive stylus) and to sense stylus data (e.g., a signal produced by an active stylus). The stylus data can include noise from one or more sources, for example. In some examples, the electronic device uses the touch data to determine a characteristic of one of the sources of noise (e.g., a profile of noise generated by a proximate object capacitively coupling to the stylus) and the stylus data to determine another characteristic of the source of noise (e.g., a scalar gain of the noise generated by the proximate object) and one or more characteristics of another source of noise (e.g., scalar coefficients to model noise generated by a display using a predetermined function). After modeling the noise, the electronic device can remove the noise from the stylus data to improve the accuracy of the stylus scan.

Figure 1A:
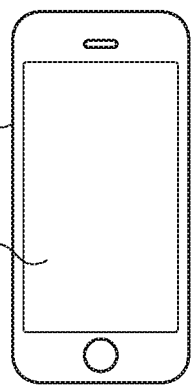
FIGS. 1A-1E illustrate example systems that can use noise mitigation techniques according to examples of the disclosure.
Figure 1B:
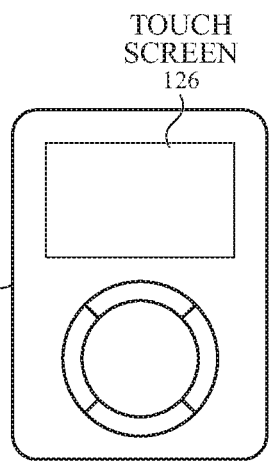
Figure 1C:
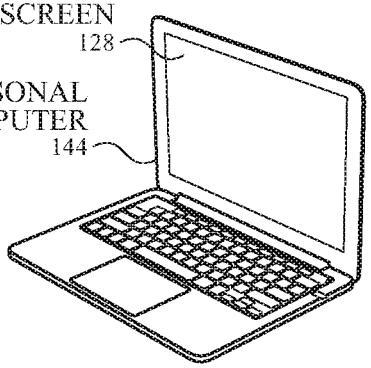
Figure 1D:
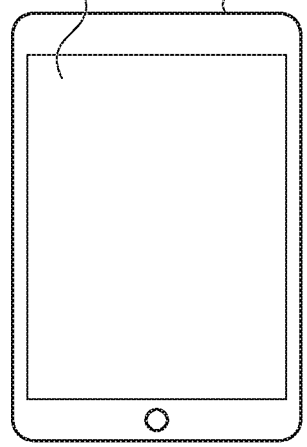
Figure 1E:
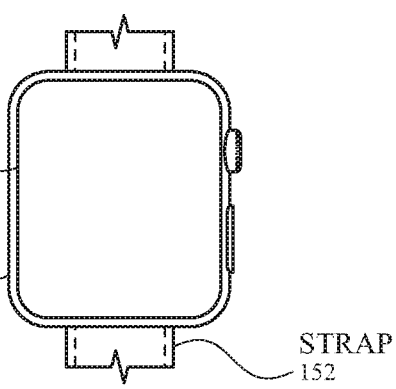

FIGS. 1A-1E illustrate example systems that can use noise mitigation techniques according to examples of the disclosure. FIG. 1A illustrates an example mobile telephone 136 that includes a touch screen 124 that can use noise mitigation techniques according to examples of the disclosure. FIG. 1B illustrates an example digital media player 140 that includes a touch screen 126 that can use noise mitigation techniques according to examples of the disclosure. FIG. 1C illustrates an example personal computer 144 that includes a touch screen 128 that can use noise mitigation techniques according to examples of the disclosure. FIG. 1D illustrates an example tablet computing device 148 that includes a touch screen 130 that can use noise mitigation techniques according to examples of the disclosure. FIG. 1E illustrates an example wearable device 150 that includes a touch screen 132 and can be attached to a user using a strap 152 and that can use noise mitigation techniques according to examples of the disclosure. It is understood that a touch screen and noise mitigation techniques can be implemented in other devices as well. Additionally it should be understood that although the disclosure herein primarily focuses on touch screens, the disclosure of noise mitigation techniques can be implemented for devices including touch sensor panels (and displays) that may not be implemented as a touch screen.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other (e.g., as described below with reference to FIG. 4A) on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

In some examples, touch screens 124, 126, 128, 130, and 132 can sense an active stylus. An exemplary active stylus is described below with reference to FIG. 5. The active stylus can produce a stylus signal that can capacitively couple to the touch electrodes of touch screen 124, 126, 128, 130, and 132 to be sensed by sense circuitry coupled to the touch electrodes. In some examples, a touch screen including touch node electrodes 408 can determine the location of the stylus by determining which touch node electrodes 408 detect the stylus signal. In some examples, a touch screen including row electrodes 404 and column electrodes 406 can determine the location of the stylus along the rows and along the columns to determine the location of the stylus on the touch screen. Touch screens can be configured to detect both passive conductive objects (e.g., fingers, passive styluses) and active styluses. For example, the electronic device can perform a mutual or self capacitance scan to detect the conductive objects (e.g., perform a "touch scan") and perform stylus scans to detect the active stylus.

Figure 2:
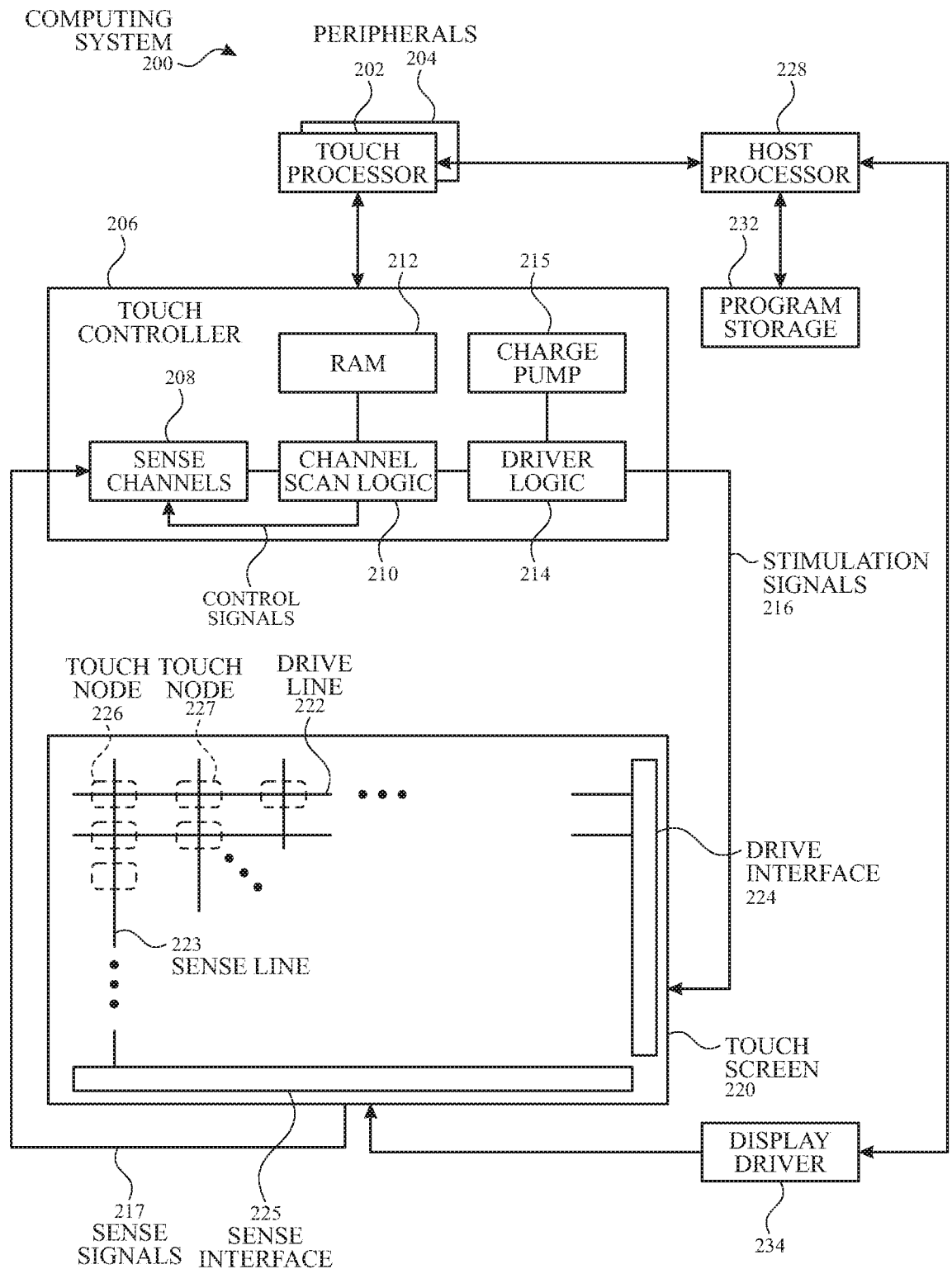
FIG. 2 illustrates an example computing system including a touch screen that can use noise mitigation techniques according to examples of the disclosure.

FIG. 2 illustrates an example computing system including a touch screen that can use noise mitigation techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including noise mitigation techniques, can be performed by firmware stored in memory (e.g., one of the peripherals 204 in FIG. 2) and executed by touch processor 202 and/or touch controller 206, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
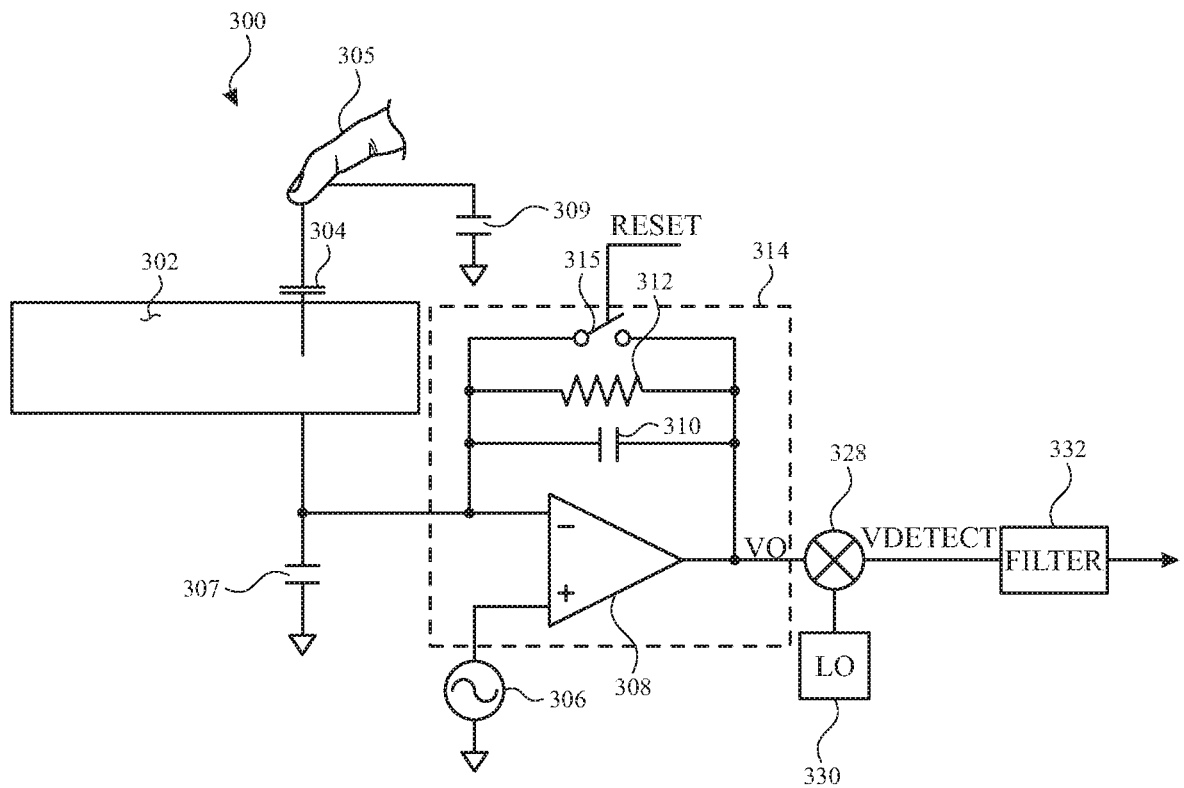
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., implemented in the one or more sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
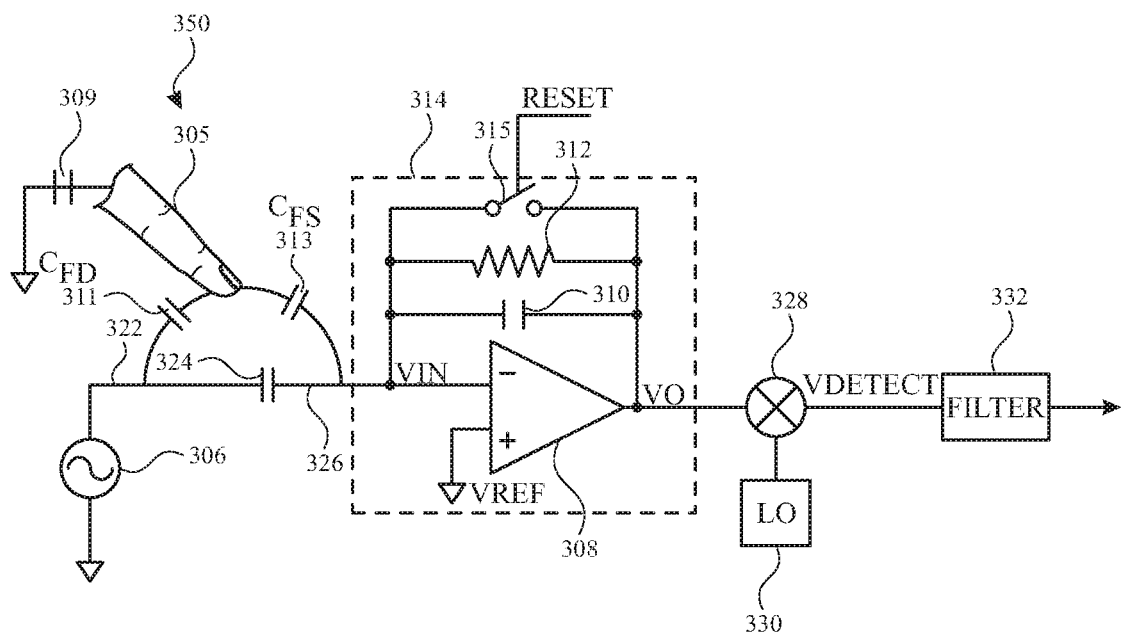
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., implemented in the one or more sense channels 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 $V_o$ can be filtered and heterodyned or homodyned by being fed into multiplier 328, where $V_o$ can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output $V_o$ may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

In some examples, a stylus signal can be detected using touch sensor circuit 350 or similar circuitry. Instead of the drive circuitry providing a stimulation signal (e.g., via AC stimulation source 306) to drive lines 322, the stylus can provide a stylus signal that capacitively couples to sense line 326. The coupled signal can be sensed by sensing circuit 314. In some examples, because the stylus provides the stimulation signal, row electrodes and column electrodes (drive lines and sense lines in the mutual capacitance touch sensing) can be coupled to sensing circuits and can be sensed. For example, the electronic device can perform one or more scans to sense the row electrodes during a first time and can then perform one or more scans to sense the column electrodes during a second time. In some examples, the row electrodes and column electrodes can be sensed simultaneously. In some examples, a touch screen 402 including touch node electrodes 408 can sense an active stylus in a similar manner (e.g., each can be coupled to a sensing circuit 314. Additional examples of active styluses and sensing active styluses are described below with reference to FIGS. 5 and 6.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
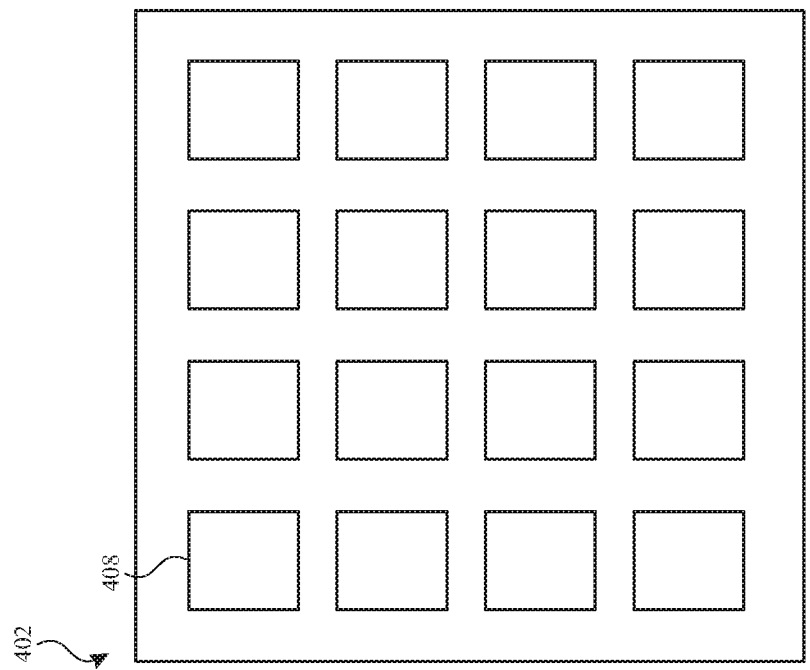
FIG. 4B illustrates touch screen with touch node electrodes arranged in a pixelated touch node electrode configuration according to examples of the disclosure.
Figure 4A:
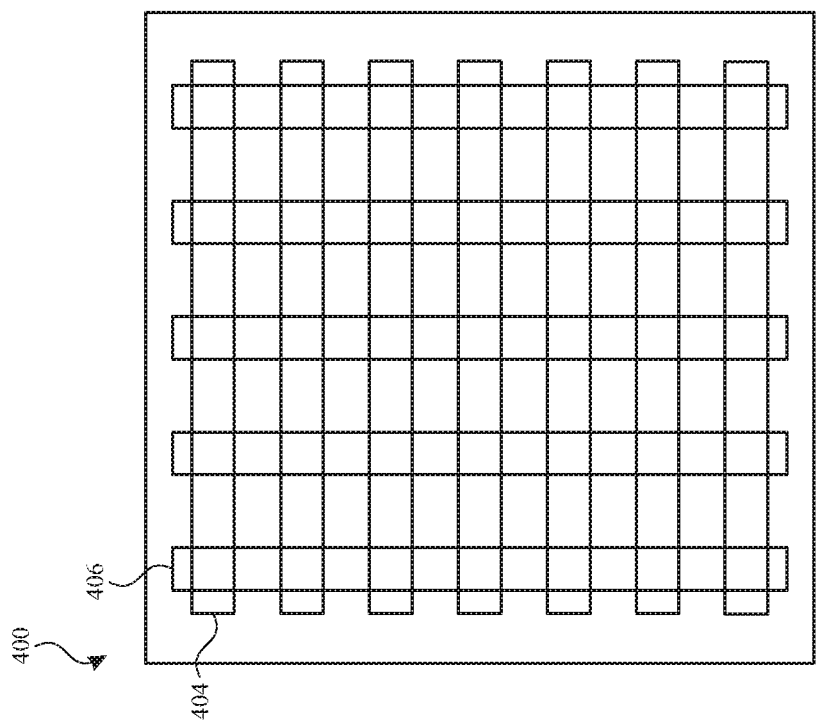
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. In some examples, touch screen 400 can sense a stylus signal provided by an active stylus using touch electrodes 404 and 406.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. In some examples, touch screen 402 can use touch electrodes 408 to sense an active stylus.

Figure 5:
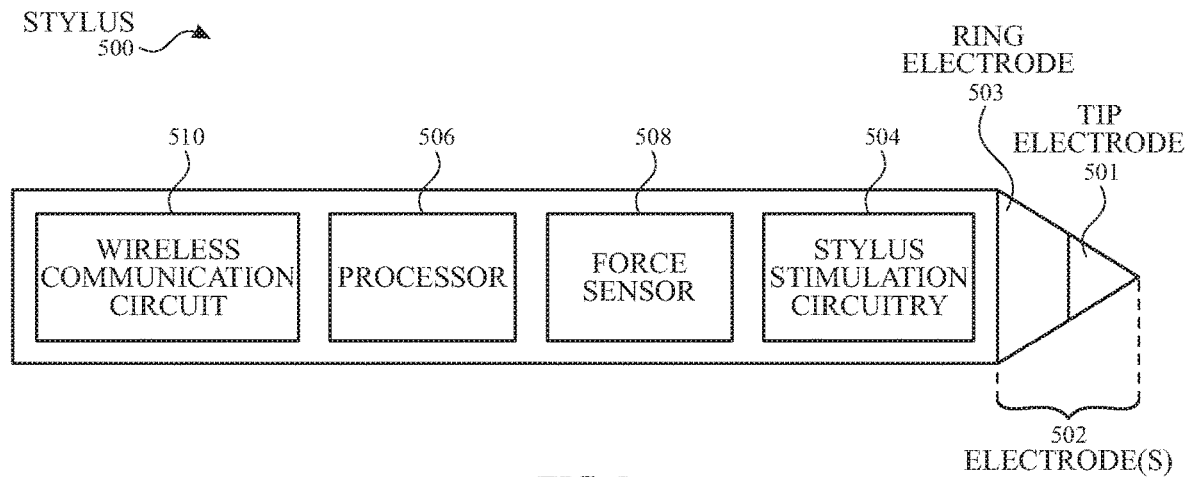
FIG. 5 illustrates an example active stylus according to examples of the disclosure.

As discussed herein, in addition to performing touch scans to detect an object such as a finger or a passive stylus, computing system 200 can also perform stylus scans to detect an active stylus and can communicate with a stylus. For example, an active stylus can be used as an input device on the surface of a touch screen of a touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO, if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch processor 202. The received signals can be used to determine a location of active stylus 500 at the surface of touch screen 220.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in a memory (not shown)) and/or transmitted (via a wired connection or wirelessly) to the computing system 200. For example, the force information can be communicated to host processor 228 or touch processor 202 in computing system 200. Force information and corresponding location information can be processed together by host processor 240 and/or touch processor 202.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the force information from the stylus 500 to the wireless communication circuitry of computing system 200 (not shown in FIG. 2). The wireless communication circuit 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals at electrodes 502 based on, or at, the one or more low noise frequencies. In some examples, the stylus stimulation circuitry 504 can generate stimulation signals at two or more different frequencies (e.g., at one frequency at the ring electrode 503 and at a second frequency at the tip electrode 501), though in other examples, stimulation signals are only generated by the stylus at one frequency. In some examples, information, such as information about stylus stimulation frequencies and scan event plans, can be transmitted from touch processor 202 and/or touch controller 206 to wireless communication circuitry of computing system 200 via host processor 228. In other examples, information, such as clock synchronization information, can be communicated directly from touch processor 202 and/or touch controller 206 to wireless communication circuitry of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
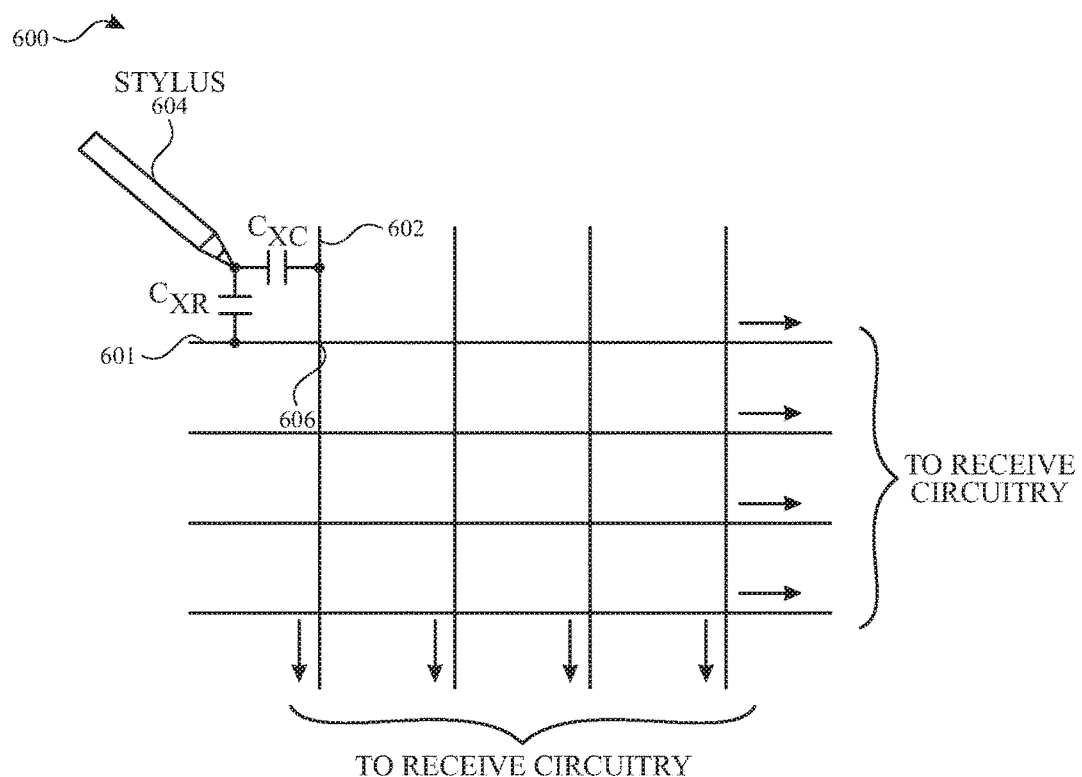
FIG. 6 illustrates an example touch sensor panel configuration operable with the computing system of FIG. 2 to perform a stylus scan according to examples of the disclosure.

FIG. 6 illustrates an example touch sensor panel configuration operable with the computing system 200 of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the driver logic 214 and/or drive interface 224 can be disabled, i.e., no stimulation signals Vstim from the touch controller are sent to touch sensor panel 600. The capacitive coupling (e.g., mutual capacitance) can be received by the sense channels 208 and/or sense interface 225 from the row and column traces of the one or more touch nodes 606 for processing. As described herein, in some examples the one or more stylus stimulation signals can have one or more frequencies. The one or more frequencies can be selected by the touch controller 206 and/or touch processor 202 using information from a stylus spectral analysis scan. This frequency information can be wirelessly communicated to the stylus 604 so that the stylus 604 can generate stimulation signals at the appropriate frequencies.

In some examples, one or more multiplexers can be used to couple row and/or column electrodes to the receive circuitry (e.g., sense channels 208 and/or sense interface 225). For example, during a mutual capacitance touch sensing scan, row traces can be coupled to the transmit section and column traces can be coupled to the receive section. During a stylus sensing scan, column traces (or row traces) can be coupled via the one or more multiplexers to the receive section to detect input from a stylus or other input device along one axis of the touch screen, and then the row traces (or column traces) can be coupled via the one or more multiplexers to the receive section to detect input from a stylus or other input device along a second axis of the touch screen. In some examples, the row and column traces can be sensed simultaneously. In some examples, the stylus can be detected on the column traces concurrently with the mutual capacitance scan touch sensing scan. The touch and stylus signals can be differentiated by using different stimulation frequencies and filtering and demodulating the received response signals at the different frequencies.

Figure 7A:
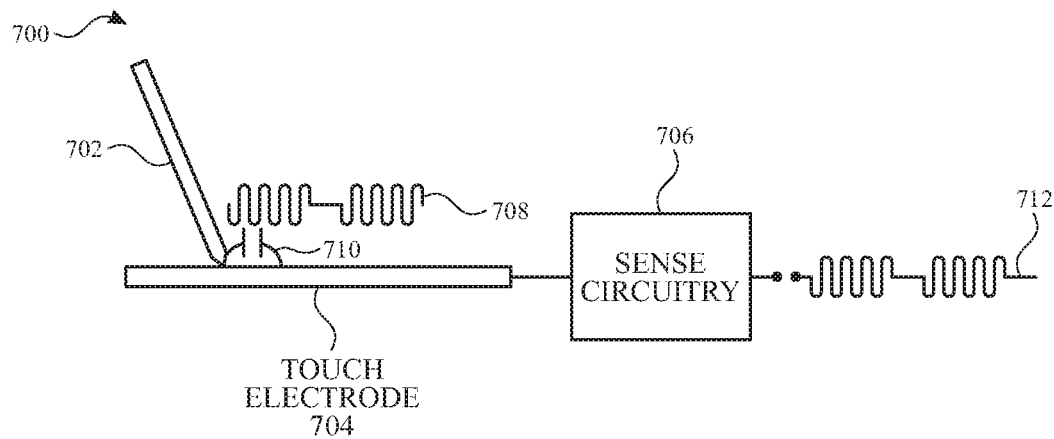
FIGS. 7A-7B illustrate part of exemplary touch circuitry that senses an active stylus according to some examples of the disclosure.
Figure 7B:
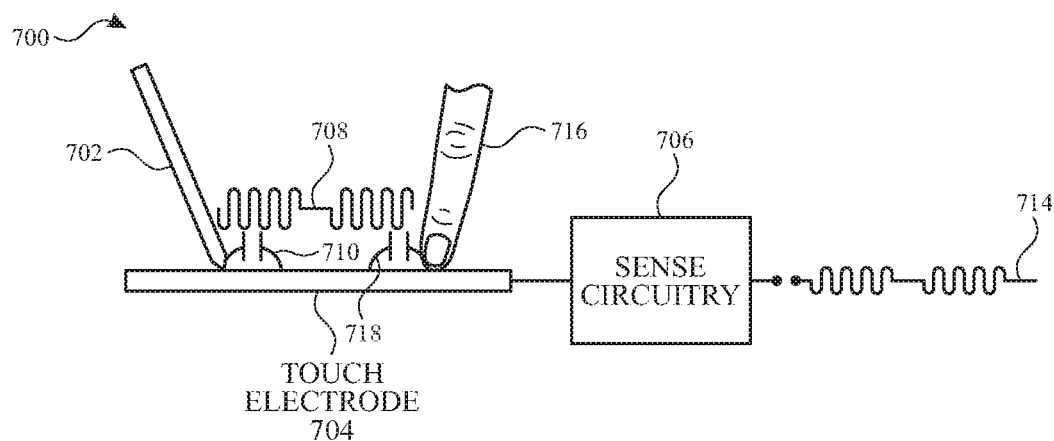

FIGS. 7A-7B illustrate part of exemplary touch circuitry 700 that senses an active stylus 702 according to some examples of the disclosure. Touch circuitry 700 includes a touch electrode 704 coupled to sense circuitry 706. Touch electrode 704 can be similar to touch electrodes 222, 223, 302, 326, 404, 406, 408, 601, or 602 described above. Sense circuitry 706 can resemble the sense circuitry 300 or 350 described above with reference to FIGS. 3A-3B.

In some examples, stylus 702 produces signal 708, which can be applied to touch electrode 704 via capacitive coupling 710. Thus, sense circuitry 706 is able to sense the stylus signal 708. As shown in FIG. 7A, when the stylus 702 is in contact with the touch electrode 704 without another object, such as a finger, being capacitively coupled to touch electrode 704, sense circuitry 706 can output an output signal 712. In some examples, the magnitude of output signal 712 can be sufficiently large (e.g., exceeding a predetermined threshold) to detect the presence of the stylus 702. Detecting the presence of the stylus can allow the user to control or provide other inputs to the electronic device using stylus, such as using the stylus to select a user interface element or to write or draw on the touch screen of the electronic device.

As shown in FIG. 7B, the magnitude of the output signal 714 can be less than the magnitude of the output signal 712 when the touch electrode 704 is capacitively coupled to a finger 716 in addition to being capacitively coupled to the stylus 702. Finger 716 can form capacitive coupling 718 when it is in contact with (or proximate to) the touch electrode 704. Thus, some of the charge generated by stylus 702 to produce signal 708 can be capacitively coupled to finger 716 via capacitive couplings 710 and 718 to the touch electrode 704. Thus, in some examples, some of the charge generated by the stylus 702 can be capacitively coupled to the finger 716 instead of being sensed by sense circuitry 706. Thus, the magnitude of output signal 714 can be less than the magnitude of output signal 712. In some examples, a conductive object other than finger 716 can be capacitively coupled to touch electrode 704 to cause a similar reduction in the magnitude of output signal 714. The reduction in the output signal described above can be a parasitic coupling path via the finger and can represent one form of noise to be mitigated using the techniques described herein.

In some examples, reducing the magnitude of output signal 714 can cause the magnitude of the output signal 714 to be less than a predetermined threshold for detecting stylus presence. Moreover, some of the charge coupled to the finger 716 from the stylus 702 can be injected at other locations of the touch screen at which the finger 716 is in contact (or proximate to), causing increased noise in the received stylus data, which can also make it more difficult for the electronic device to detect the presence of the stylus 702. In some examples, intermittent or reduced ability to detect the stylus can impact the performance of the electronic device and the user's experience operating the electronic device, as will be described below with reference to FIGS. 8A-8B.

Figure 8A:
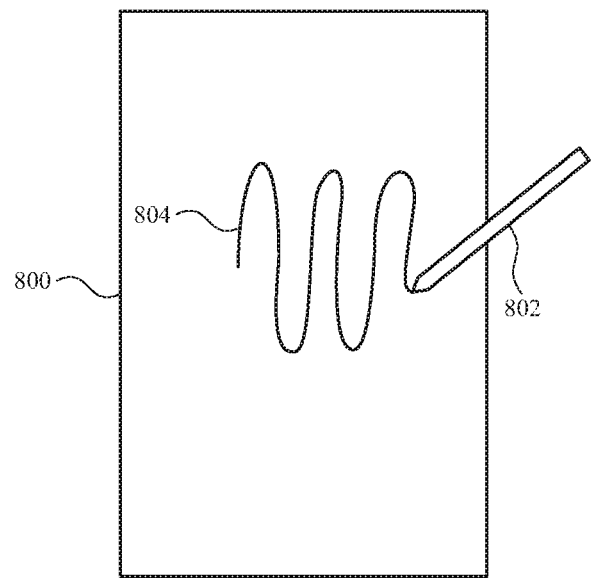
FIGS. 8A-8B illustrate exemplary use of a stylus on touch screen with and without another touch object according to some examples of the disclosure.
Figure 8B:
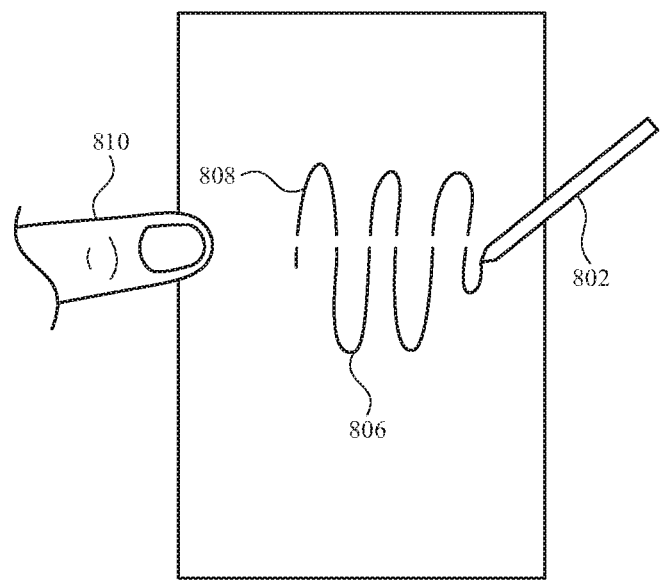

FIGS. 8A-8B illustrate exemplary use of a stylus 802 on touch screen 800 with and without another touch object according to some examples of the disclosure. In some situations, a finger 810 (or other conductive touch object) in contact with touch screen 800 can reduce the ability of the electronic device 800 to detect the stylus 802 with touch screen 800.

As shown in FIG. 8A, a user is able to provide input to touch screen 800 (e.g., to draw a drawing 804 on touch screen 800, or provide other inking inputs similar to the use of pen on paper) using stylus 802. In the absence of other conductive objects proximate to the touch screen 800, the electronic device is able to continuously detect the stylus 802 and render the entire drawing 804, inking the path of stylus 802 without interruptions. In contrast, as shown in FIG. 8B, the presence of a finger 810 in contact with (or proximate to) touch screen 800 can interfere with continuous detection of the stylus 802. As shown in FIG. 8B, the drawing 806 can include breaks 808 at locations at which detection of the stylus 802 was interrupted. For example, locations along a touch electrode (e.g., a row electrode) that both the stylus 802 and the finger 810 are in contact with (or proximate to), can include breaks 808 in drawing 806 because the finger 810 can interfere with detection of the stylus 802 at these locations, as described above with reference to FIGS. 7A-7B.

The touch screen 800 can detect increased noise at touch electrodes the finger 810 touches (or is in close proximity to) due to parasitic coupling through finger 810, which can decrease the touch screen's ability to detect the stylus 802 at those locations. Thus, in some examples, it can be advantageous to characterize the noise injected by the finger 810 so the electronic device can remove the noise and detect the location of the stylus 802. Additionally, removing this noise with reduced lag can improve the user experience by providing highly responsive continuous inking that is intuitive and familiar to inking with a pen on paper. In some examples, the touch screen 800 also experiences noise from additional sources, such as noise caused by capacitive coupling of one or more signals used to display an image with a display included in touch screen 800 (or overlapping a touch sensor panel to form touch screen 800). In some examples, the electronic device characterizes noise from the finger and the display separately (e.g., characterize display noise separately from proximate touch object noise) and/or removes display noise separately from proximate touch object noise. In some examples, the electronic device characterizes noise from the finger and the display together and removes noise from the stylus data. It should be understood that, in some examples, a conductive object other than a finger can cause similar noise in the stylus data and that the electronic device can characterize and remove noise caused by the conductive object in a manner similar to the manner described herein with respect to finger 810.

Figure 9A:
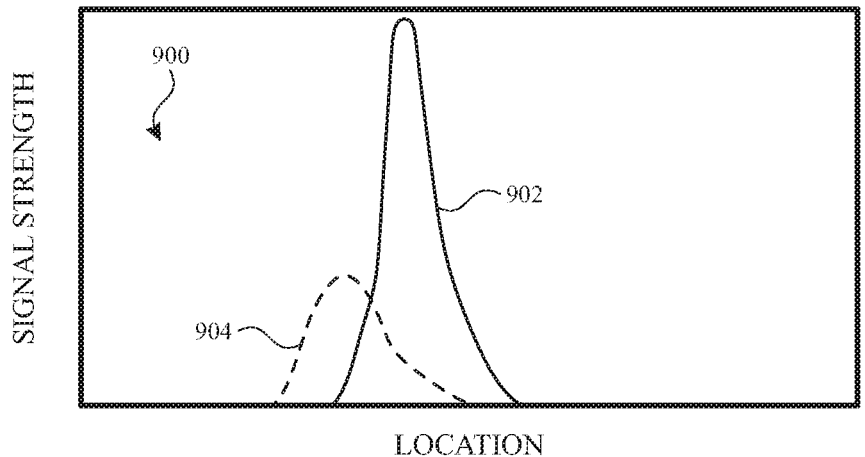
FIGS. 9A-9C illustrate exemplary stylus data resulting from a stylus scan along one dimension of a touch screen according to some examples of the disclosure.
Figure 9B:
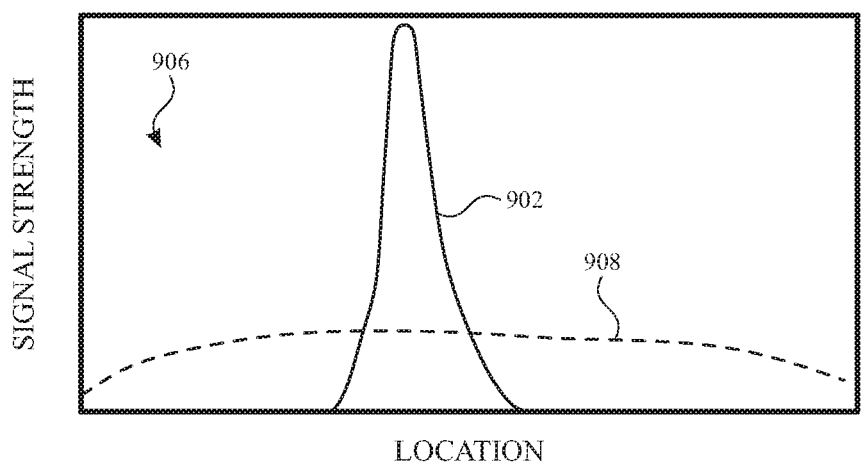
Figure 9C:
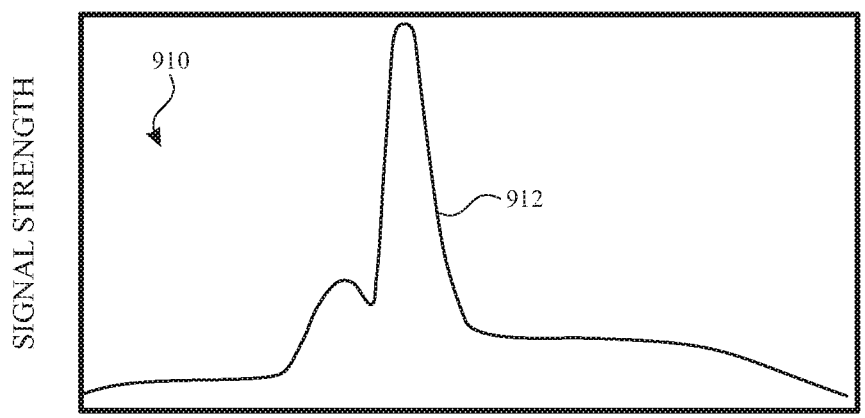

FIGS. 9A-9C illustrate exemplary stylus data resulting from a stylus scan along one dimension of a touch screen according to some examples of the disclosure. For example, the stylus data can be sensed using touch electrodes 404 or 406 of touch screen 400 described above with reference to FIG. 4A. The stylus signal and noise can capacitively couple to the touch electrodes 404 or 406 and can be sensed by sense circuitry. In some examples, the stylus data can include noise caused by display circuitry and noise caused by a proximate object, such as a finger. Plots 900, 906, and 910 illustrate the signal strength of each signal described below at each location along one axis of the touch screen (e.g., along rows 404 or columns 406).

FIG. 9A illustrates a plot 900 including a stylus signal 902 and noise 904 caused by a proximate object. FIG. 9B illustrates a plot 906 including the stylus signal 902 and noise 908 caused by the display. FIG. 9C illustrates a plot 910 of the signal observed by the electronic device in the presence of various noise sources. In some examples, the electronic device characterizes and removes the noise 904 caused by the proximate object and the noise 908 caused by the display in order to determine the profile of the stylus signal 902 to accurately sense the stylus. Accurately characterizing and removing the noise (e.g., according to process 1000) can provide improved accuracy of stylus detection and position (e.g., compared with using a threshold to subtract signal values below a static noise threshold).

As described herein, an electronic device including a touch screen or touch sensor panel can perform a process to characterize and remove noise. In some examples, the electronic device can perform, during each sensing frame, a touch scan (e.g., to detect passive touch objects such as fingers) to generate touch data (e.g., a touch image for touch scans) and a stylus scan (e.g., to detect an active stylus) to generate stylus data (e.g., a touch image for stylus scans). In some examples, the touch data can be represented by a two-dimensional array of values (e.g., a matrix in which rows and columns correspond to x and y coordinates) and the stylus data can be represented by two one-dimensional arrays of values (e.g., two vectors, one representing stylus signal for x coordinates and one representing stylus signals for y coordinates). Thus, in some examples, the stylus scan can include two measurements: one for each axis of touch electrodes. The touch data and stylus data for a sensing frame can be used to characterize noise for the sensing frame. The characterized noise from the sensing frame can be used to subtract the characterized noise from the stylus data to improve detection of the stylus.

Figure 10:
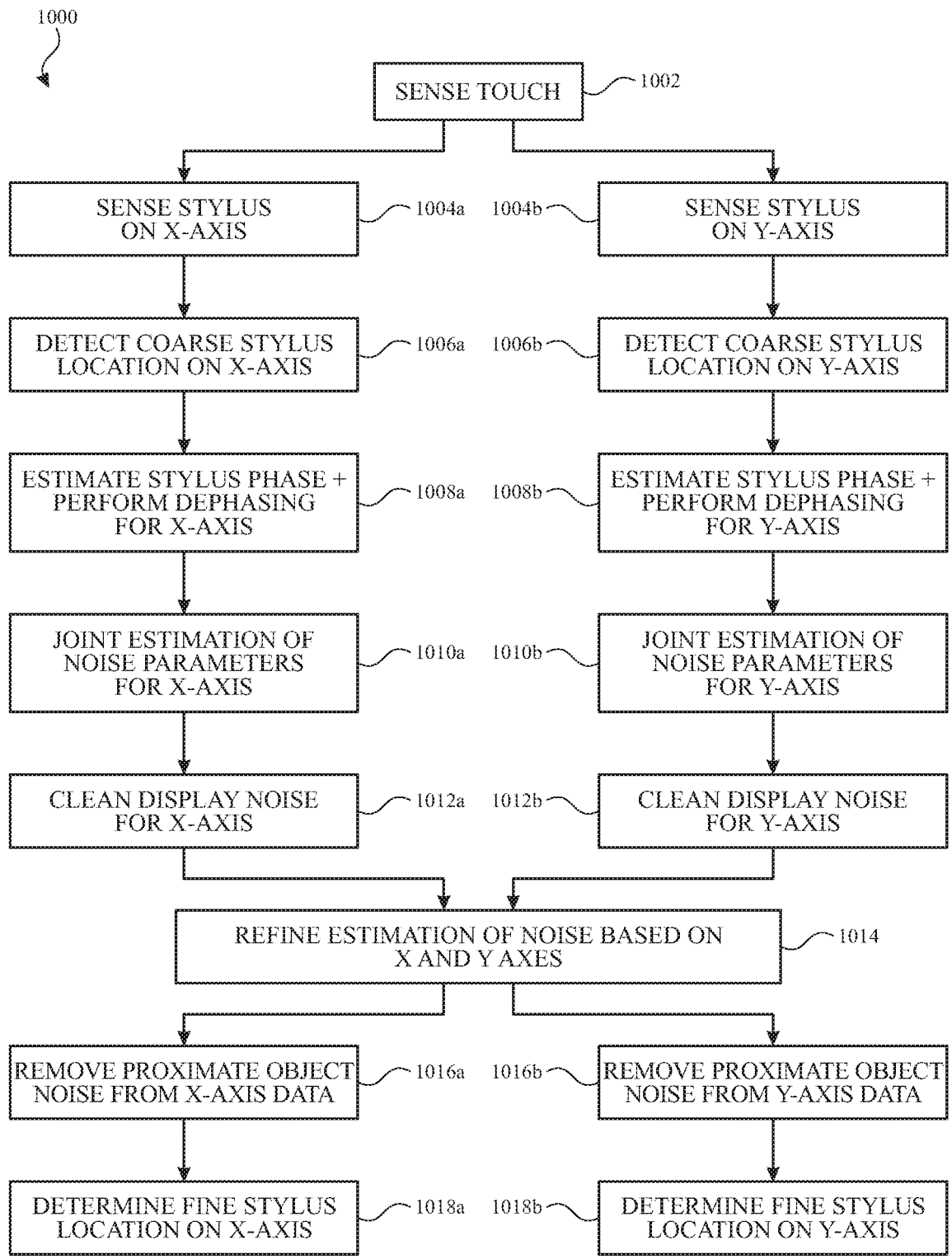
FIG. 10 illustrates an exemplary process for characterizing and removing noise of multiple sources from stylus data according to some examples of the disclosure.

FIG. 10 illustrates an exemplary process 1000 for characterizing and removing noise of multiple sources from stylus data according to some examples of the disclosure. Process 1000 can be carried out using one or more of the systems (e.g., touch controller 206 and/or touch processor 202) described above with reference to FIGS. 1-9.

At 1002, an electronic device can sense touch (e.g., by a finger or another conductive object) on a touch screen (e.g., touch screen 220, 400 or 402) in a touch sensing scan. Sensing touch can include sensing a mutual or self-capacitance of one or more touch electrodes included in the touch screen (e.g., to generate a touch image). Based on the sensed touch data from a touch sensing scan, the electronic device can determine the presence of and location(s) of one or more conductive object(s) touching (or in close proximity to) the touch screen. Additionally, in some examples, a profile of the parasitic noise 904 due to a proximate touch object can be estimated based on the touch data. In some examples, touch data can be used by the electronic device to estimate the shape (e.g., the profile of the curve) and location (e.g., the location along an axis of touch electrodes at which the object is located) of the noise 904 caused by the proximate object. In some examples, the noise can be modeled as a scalar gain ("g") multiplied with the touch data (e.g., a touch image, or a portion of the touch image corresponding to the location of the stylus (but excluding the stylus), that can be represented with a vector "v"). In some examples, as described herein, the model of proximate object noise impact on the stylus signals may be applied to estimate noise together with other characteristics of noise during other operations of process 1000.

In some examples, the electronic device senses touch 1002 using mutual capacitance as described above with reference to FIGS. 2, 3B, and 4A, for example. In some examples, sensing touch with a mutual capacitance scan involves using a first set of touch electrodes (e.g., a respective one of rows 404 and columns 406) as drive lines driven with a stimulation signal and using a second set of touch electrodes (e.g., the respective other of the rows 404 and columns 406) as sense lines to sense the resulting touch signal coupling between the drive lines and sense lines. The resulting touch image from sensing mutual capacitance provides for a determination of a two-dimensional location of the proximate object.

In some examples, the electronic device senses stylus 1004a-b as described above with reference to FIG. 6. In some examples, the stylus signal can be sensed one dimension at a time. For example, row electrodes 404 can be all sensed to determine the location of the stylus along the rows in a first stylus scan step (e.g., row stylus scan) and the column electrodes 406 can be sensed to determine the location of the stylus along the columns in a second stylus scan step (e.g., column stylus scan). The stylus data resulting from the stylus scan can include noise along each dimension can also be sensed and included in the stylus data. In some examples, by splitting stylus sensing into two scan steps, as the stylus data can provide two locations of the stylus (and of the noise)—each location being along one of two perpendicular axes (e.g., the rows 404 and columns 606) of the touch screen 400. Thus, some operations of process 1000 are completed twice: once for each axis, such as operations 1004-1012, 1016, and 1018. In some examples, completion of these operations for each axis can occur in parallel or serially. Although FIG. 10 illustrates operations for each axis, the operations that occur once for each axis will be described with respect to one axis (x-axis) for the sake of brevity. It should be understood that corresponding operations can be performed in the same manner for the second axis (y-axis).

Returning to FIG. 10, at 1004a, the electronic device can sense the stylus data along the x-axis of the touch screen. The electronic device can sense stylus data in a manner similar to the manner described above with reference to FIG. 6. Sensing the stylus can include sensing an observed signal 912 that includes the stylus signal 902 and noise (e.g., noise 904 caused by a proximate object and noise 908 caused by a display). The sensed stylus data can be modeled by equation (1):

$$z=(x-g\cdot v)e^{j\theta}+D+w \qquad (1)$$

where z represents the measured data from the stylus from the stylus scan (complex vector), x represents the stylus signal 902 (real vector), v is the touch data obtained at 1002 (real vector), g represents the gain of the conductive object noise 904 (real scalar), $\theta$ represents the phase of the stylus signal, D is the display noise 908 (complex vector), and w is additive noise (complex vector). The touch data v can be determined at 1002 of process 1000 and can represent the shape of the conductive object noise 1002. In order to characterize the noise, equation (1) can be solved, as described in more detail below, to estimate values for parameters g, D, and/or w using process 1000. In some examples, solving equation (1) can be achieved using a least squares algorithm or other suitable technique (e.g., principal component analysis, etc.)

At 1006a, the electronic device can detect a coarse location of the stylus. Although the electronic device may be unable to accurately resolve a fine location of the stylus without removing noise, in many situations, the electronic device is able to estimate the presence of and approximate location of the stylus. As shown in FIGS. 9A-9C, the stylus signal 902 has a higher magnitude than the noise 904 caused by the proximate object and the noise 908 caused by the display. Thus, the electronic device can estimate the location of the stylus by determining the touch electrode at which the observed stylus signal (including noise) is maximum (e.g., peak detection), for example (or an approximate profile by zeroing out all stylus signal values below a threshold). As shown in FIGS. 9A-9C, the stylus signal 902 can have a higher magnitude than the proximate object noise 904 and the display noise 908. The electronic device can use the coarse location of the stylus to remove samples from touch nodes collocated with the stylus in order to characterize the proximate object noise 904 and the display noise 908 without viewing the true stylus signal as noise. Additionally, restricting the used samples (of vector v) to rows/columns at which the stylus is detected can be preferred because the touch samples sensed at these locations will have a higher contributions from the noise sources due to parasitic coupling through the proximate object and from the display.

At 1008a, the electronic device can identify a phase of the stylus signal. As described above, the measured stylus signal can be complex including both a real portion and an imaginary portion. Estimating the phase θ can simplify equation (1) to focus on the real portion of the measured stylus signal. The de-phasing can decrease the observed noise in vector z, thereby removing components of noise (e.g., from display noise D and additive noise w) that are not in-phase with the stylus signal. The electronic device can obtain two options for the estimated phase using the following expression: $\hat{\theta}=\frac{1}{2}\angle\{z^T z\}$, and select $\hat{\theta}$ using the coarse stylus location obtained at 1002. After estimating the phase $\hat{\theta}$ 0 of the stylus signal, the real part of the stylus signal y can be obtained by calculating $y = \mathcal{R}\{ze^{-j\hat{\theta}}\}$.

At 1010a, the electronic device can estimate the parameters of the proximate object noise 904 and the display noise 908. The electronic device can estimate the parameters of both noise sources jointly because the noise sources can corrupt the measured signal at the same time. As described above, the proximate object noise 904 can be represented by the expression g·v (e.g., a scalar gain g multiplied by the touch data vector v). The display noise 908 D can be modeled with the quadratic equation expressed below as equation (2):

$$D = (\alpha \cdot p^2 + \beta \cdot p + \gamma) e^{j\varphi} \quad (2)$$

where p represents a vector of sensor locations along one axis excluding sensors proximate to the estimated location of the stylus; α, β, and γ represent unknown parameters to be estimated, and φ represents the phase of the display noise 908. After dephasing at 1008a, the display noise that is observed by the sensing system can be represented more simply by $\tilde{D}=D\cdot\cos(\varphi-\theta)$. Thus, in some situations, dephasing can substantially reduce the impact of D on the observed stylus data, such as when φ−θ is approximately $$\frac{\pi}{2}.$$

Even when φ−θ is not approximately $$\frac{\pi}{2},$$

dephasing can still significantly reduce noise because cos (φ−θ) is always less than 1. In some situations, dephasing at 1008a can be sufficient for mitigating display noise in the stylus data. In situations where dephasing is not sufficient, a system of equations can be constructed to estimate the parameters g, α, β, and γ. The vector of stylus data samples y can be annotated as shown below by equations (3)-(5):

$$y = \begin{bmatrix} -v & p^2 & p & 1 \end{bmatrix} \begin{bmatrix} g \\ \alpha \\ \beta \\ \tilde{\gamma} \end{bmatrix} \quad (3)$$

For the sake of simplicity, let:

$$A = \begin{bmatrix} -v & p^2 & p & 1 \end{bmatrix} \text{ and} \quad (4)$$

$$b = \begin{bmatrix} g \\ \alpha \\ \beta \\ \tilde{\gamma} \end{bmatrix} \quad (5)$$

Thus, the parameters g, α, β, and γ can be estimated by using the least squares approach (or other techniques) to solve equation (6):

$$b = (A^T \cdot A)^{-1} \cdot A^T \cdot y \quad (6)$$

At 1012a, the de-phased display noise 908, which can be modeled as $\tilde{D}=\tilde{\alpha}\cdot p^2+\beta\cdot p+\tilde{\gamma}$ using the estimated values for α, β, and γ obtained at 1010a, can be removed from the sampled data (e.g., by subtraction).

Operations 1004b-1012b can be performed for the y-axis in a similar manner in which operations 1004a-1012a were performed for the x-axis, respectively. In some situations, the electronic device will be able to estimate both the display noise 908 and the proximate object noise 904 independently for each axis. In some situations, however, refinement 1014 can be performed to use data from one axis to determine noise parameters for another axis. For example, suppose the proximate object has the same centroid along the y-axis as the stylus (e.g., the proximate object and the stylus are located at the same row electrode). If, in this example, there are not enough samples including the proximate object that exclude the stylus along the y-axis to determine the parameters of the proximate object noise for the y-axis independently, the proximate object noise can be characterized along the x-axis, and that characterization can be used to characterize the proximate object noise along the y-axis. In some examples, the more data used to solve equation (3), the better the estimation of the noise parameters will perform. If, for example, there are not enough samples in one axis to achieve sufficient estimation of the noise parameters, the electronic device can use data and/or one or more parameter values obtained from the other axis for the estimation.

In some examples, the proximate object noise on the x-axis, $n_x$, can be related to the proximate object noise on the y-axis, $n_y$, by equation (7):

$$\frac{n_x}{n_y} = r + q \quad (7)$$

where r represents a known average ratio of the signal of the x-axis over the signal of the y-axis and q represents a random variable having the value $q=N(0, \sigma^2)$ (e.g., a gaussian variable with an average value of 0 and a variance of σ). It should be understood that equation (7) is one possible relationship between the two axes, but that the relationships can be used (e.g., based on a different random variable, based on a higher order relationship with average ratio r, etc.). Thus, in situations in which the electronic device is only able to estimate the gain g of the proximate object noise 904 for one axis (or is able to estimate the gain for the axis, but without a threshold confidence due to the limited number of available samples), refinement (e.g., using equation (7)) can be used to determine the gain g of the proximate object noise 904 in the other axis. Again, in some situations, the electronic device is able to determine g for each axis independently and may forgo operation 1014.

At 1016a, the electronic device can remove the proximate object noise 904 from the stylus data by subtracting it. As described above, in some situations, the proximate object noise 904 can be characterized at 1010a and, in some situations, the proximate object noise 904 can be characterized at 1014.

At 1018a, the electronic device can determine the fine location of the stylus along the x-axis by removing both the proximate object noise 904 and the display noise 908 (e.g., which may be optionally removed earlier at 1012a) from the stylus data sampled along the x-axis. Likewise, operations 1016b and 1018b can be performed for the y-axis in a similar manner in which 1016a and 1018a are performed for the x-axis, to determine the location of the stylus along the y-axis by removing the proximate object noise 904 and the display noise 908 from the stylus data sampled along the y-axis.

Thus, process 1000 can be used to reduce or remove display noise 908 and/or proximate object noise 904 from stylus data 912 to determine the stylus signal 902 in each dimension and thereby more accurately determine the location of the stylus. Process 1000 can enable the electronic device to characterize and remove the noise for each frame of data based on one frame of touch data and one frame of stylus data in each dimension. Thus, the noise can be removed in near-real-time because process 1000 does not rely on multiple frames of touch data or multiple frames of stylus data in each dimension.

In some examples, variations of process 1000 are possible. For example, in situations in which there is no proximate object other than the stylus present at the touch screen, process 1000 can be modified to estimate the display noise only. For example, equations 1-5 can exclude the gain g of the proximate object noise and the touch data v and process 1000 can exclude removing proximate object noise 1016a-b. As another example, display noise can be characterized or modeled in a different way and process 1000 can be modified to estimate the proximate object noise, and not the display noise. For example, the display noise can be estimated as a predetermined value or function. In some examples where the display noise is already determined, equations 1-5 can exclude D, its parameters α, β, and γ, and the form of the quadratic equation (e.g., $p^2$, p, and the vector of 1 s). Additional steps or equations of process 1000 can be modified to fit a number of different situations.

Thus, in some examples, the electronic device is able to characterize and reduce or remove noise from stylus data according to the examples described above with reference to FIGS. 1-10.

Some examples of the disclosure are directed to an electronic device comprising: a touch screen including a plurality of touch electrodes; sense circuitry coupled to the plurality of touch electrodes, the sense circuitry configured to: sense, using the sense circuitry, touch data during a touch scan of the touch screen; and sense, using the sense circuitry, stylus data during a stylus scan of the touch screen, wherein the stylus data includes a stylus signal, first noise, and second noise; one or more processors configured to: identify a first characteristic of the first noise based on the touch data; calculate a second characteristic of the first noise and one or more characteristics of the second noise based on the first characteristic of the first noise and the stylus data; remove the first noise and the second noise from the stylus data. Additionally or alternatively, in some examples the sense circuitry is configured to sense a frame of data, the frame of data including a two-dimensional array of touch data sensed during the touch scan and two one-dimensional arrays of stylus data sensed during the stylus scan, the two-dimensional array of touch data includes no more than one measurement per location in the two dimensional array, each one-dimensional array of stylus data includes no more than one measurement per location in each one-dimensional array, the touch data used to identify the first characteristic of the first noise is from the frame of data, the stylus data used to calculate the second characteristic of the first noise and the one or more characteristics of the second noise is from the frame of data. Additionally or alternatively, in some examples the sense circuitry is configured to sense a plurality of frames of data including the frame of data, and the frame of data does not include data from any other frames of data of the plurality of frames of data. Additionally or alternatively, in some examples the one or more processors are further configured to detect, based on the stylus data, a coarse location of the stylus, the touch data used to identify the first characteristic of the first noise does not include touch data corresponding to the coarse location of the stylus, and the stylus data used to calculate the second characteristic of the first noise and the one or more characteristics of the second noise does not include stylus data corresponding to the coarse location of the stylus. Additionally or alternatively, in some examples the one or more processors are further configured to after removing the first noise and the second noise from the stylus data, determining a fine location of the stylus based on the stylus data with the first noise and second noise removed. Additionally or alternatively, in some examples the electronic device further includes a display, wherein: the first noise is noise caused by a conductive object touching the touch screen while the stylus touches the touch screen, the first characteristic of the first noise is a profile of the first noise, the second characteristic of the first noise is a scalar gain of the first noise, the second noise is noise caused by the display, and the one or more characteristics of the second noise are coefficients of an equation modeling the second noise. Additionally or alternatively, in some examples the one or more processors are further configured to before calculating the second characteristic of the first noise and the one or more characteristics of the second noise, de-phase the stylus data. Additionally or alternatively, in some examples the second characteristic of the first noise and the one or more characteristics of the second noise are calculated simultaneously using a system of equations. Additionally or alternatively, in some examples the touch electrodes include first touch electrodes and second touch electrodes, the stylus data includes first stylus data sensed using the first touch electrodes and second stylus data sensed using the second touch electrodes, the second characteristic of the first noise of included in the first stylus data and the one or more characteristics of the second noise included in the first stylus data are calculated using the first stylus data without using the second stylus data, and the second characteristic of the first noise of included in the second stylus data and the one or more characteristics of the second noise included in the second stylus data are calculated using the second stylus data without using the first stylus data. Additionally or alternatively, in some examples the one or more processors are further configured to: in accordance with a determination that the calculation of the second characteristic of the first noise and the one or more characteristics of the second noise of the first stylus data fail to satisfy one or more criteria: re-calculating the second characteristic of the first noise and the one or more characteristics of the second noise of the first stylus data using the first stylus data and the second stylus data.

Some examples are directed to a method, comprising, at an electronic device including a touch screen that includes a plurality of touch electrodes, sense circuitry coupled to the plurality of touch electrodes, and one or more processors sensing: using the sense circuitry, touch data during a touch scan of the touch screen; sensing, using the sense circuitry, stylus data during a stylus scan of the touch screen, wherein the stylus data includes a stylus signal, first noise, and second noise; identifying a first characteristic of the first noise based on the touch data; calculating a second characteristic of the first noise and one or more characteristics of the second noise based on the first characteristic of the first noise and the stylus data; and removing the first noise and the second noise from the stylus data. Additionally or alternatively, in some examples the method further includes sensing, with the sense circuitry, a frame of data, the frame of data including a two-dimensional array of touch data sensed during the touch scan and two one-dimensional arrays of stylus data sensed during the stylus scan, wherein: the two-dimensional array of touch data includes no more than one measurement per location in the two dimensional array, each one-dimensional array of stylus data includes no more than one measurement per location in each one-dimensional array, the touch data used to identify the first characteristic of the first noise is from the frame of data, the stylus data used to calculate the second characteristic of the first noise and the one or more characteristics of the second noise is from the frame of data. Additionally or alternatively, in some examples the method further includes sensing, with the sense circuitry, a plurality of frames of data including the frame of data, wherein: the frame of data does not include data from any other frames of data of the plurality of frames of data. Additionally or alternatively, in some examples the method further includes detecting, based on the stylus data, a coarse location of the stylus, wherein: the touch data used to identify the first characteristic of the first noise does not include touch data corresponding to the coarse location of the stylus, and the stylus data used to calculate the second characteristic of the first noise and the one or more characteristics of the second noise does not include stylus data corresponding to the coarse location of the stylus. Additionally or alternatively, in some examples the method further includes after removing the first noise and the second noise from the stylus data, determining a fine location of the stylus based on the stylus data with the first noise and second noise removed. Additionally or alternatively, in some examples the electronic device further comprises a display, the first noise is noise caused by a conductive object touching the touch screen while the stylus touches the touch screen, the first characteristic of the first noise is a profile of the first noise, the second characteristic of the first noise is a scalar gain of the first noise, the second noise is noise caused by the display, and the one or more characteristics of the second noise are coefficients of an equation modeling the second noise. Additionally or alternatively, in some examples the method further includes before calculating the second characteristic of the first noise and the one or more characteristics of the second noise, de-phasing the stylus data. Additionally or alternatively, in some examples the second characteristic of the first noise and the one or more characteristics of the second noise are calculated simultaneously using a system of equations. Additionally or alternatively, in some examples the touch electrodes include first touch electrodes and second touch electrodes, the stylus data includes first stylus data sensed using the first touch electrodes and second stylus data sensed using the second touch electrodes, the second characteristic of the first noise of included in the first stylus data and the one or more characteristics of the second noise included in the first stylus data are calculated using the first stylus data without using the second stylus data, and the second characteristic of the first noise of included in the second stylus data and the one or more characteristics of the second noise included in the second stylus data are calculated using the second stylus data without using the first stylus data. Additionally or alternatively, in some examples the method further includes in accordance with a determination that the calculation of the second characteristic of the first noise and the one or more characteristics of the second noise of the first stylus data fail to satisfy one or more criteria: re-calculating the second characteristic of the first noise and the one or more characteristics of the second noise of the first stylus data using the first stylus data and the second stylus data.

Some examples of the disclosure are directed to a non-transitory computer-readable medium storing instructions, that when executed by one or more processors of an electronic device including a touch screen that includes a plurality of touch electrodes and sense circuitry coupled to the touch electrodes, causes the electronic device to perform a method comprising sensing, using the sense circuitry, touch data during a touch scan of the touch screen; sensing, using the sense circuitry, stylus data during a stylus scan of the touch screen, wherein the stylus data includes a stylus signal, first noise, and second noise; identifying a first characteristic of the first noise based on the touch data; calculating a second characteristic of the first noise and one or more characteristics of the second noise based on the first characteristic of the first noise and the stylus data; and removing the first noise and the second noise from the stylus data. Additionally or alternatively, in some examples the method further comprises: sensing, with the sense circuitry, a frame of data, the frame of data including a two-dimensional array of touch data sensed during the touch scan and two one-dimensional arrays of stylus data sensed during the stylus scan, wherein: the two-dimensional array of touch data includes no more than one measurement per location in the two dimensional array, each one-dimensional array of stylus data includes no more than one measurement per location in each one-dimensional array, the touch data used to identify the first characteristic of the first noise is from the frame of data, the stylus data used to calculate the second characteristic of the first noise and the one or more characteristics of the second noise is from the frame of data. Additionally or alternatively, in some examples the method further comprises: sensing, with the sense circuitry, a plurality of frames of data including the frame of data, wherein: the frame of data does not include data from any other frames of data of the plurality of frames of data. Additionally or alternatively, in some examples the method further comprises: detecting, based on the stylus data, a coarse location of the stylus, wherein: the touch data used to identify the first characteristic of the first noise does not include touch data corresponding to the coarse location of the stylus, and the stylus data used to calculate the second characteristic of the first noise and the one or more characteristics of the second noise does not include stylus data corresponding to the coarse location of the stylus. Additionally or alternatively, in some examples the method further comprises: after removing the first noise and the second noise from the stylus data, determining a fine location of the stylus based on the stylus data with the first noise and second noise removed. Additionally or alternatively, in some examples the electronic device further comprises a display, the first noise is noise caused by a conductive object touching the touch screen while the stylus touches the touch screen, the first characteristic of the first noise is a profile of the first noise, the second characteristic of the first noise is a scalar gain of the first noise, the second noise is noise caused by the display, and the one or more characteristics of the second noise are coefficients of an equation modeling the second noise. Additionally or alternatively, in some examples the method further includes, before calculating the second characteristic of the first noise and the one or more characteristics of the second noise, de-phasing the stylus data. Additionally or alternatively, in some examples the second characteristic of the first noise and the one or more characteristics of the second noise are calculated simultaneously using a system of equations. Additionally or alternatively, in some examples the touch electrodes include first touch electrodes and second touch electrodes, the stylus data includes first stylus data sensed using the first touch electrodes and second stylus data sensed using the second touch electrodes, the second characteristic of the first noise of included in the first stylus data and the one or more characteristics of the second noise included in the first stylus data are calculated using the first stylus data without using the second stylus data, and the second characteristic of the first noise of included in the second stylus data and the one or more characteristics of the second noise included in the second stylus data are calculated using the second stylus data without using the first stylus data. Additionally or alternatively, in some examples the method further comprises: in accordance with a determination that the calculation of the second characteristic of the first noise and the one or more characteristics of the second noise of the first stylus data fail to satisfy one or more criteria: re-calculating the second characteristic of the first noise and the one or more characteristics of the second noise of the first stylus data using the first stylus data and the second stylus data.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device, comprising:
a touch screen including a plurality of touch electrodes;
sense circuitry coupled to the plurality of touch electrodes, the sense circuitry configured to:
sense, using the sense circuitry, touch data during a touch scan of the touch screen; and
sense, using the sense circuitry, stylus data during a stylus scan of the touch screen, wherein the stylus data includes a stylus signal, first noise, and second noise;
one or more processors configured to:
identify a first characteristic of the first noise based on the touch data;
calculate a second characteristic of the first noise and one or more characteristics of the second noise based on the first characteristic of the first noise and the stylus data;
remove the first noise and the second noise from the stylus data.

2. The electronic device of claim 1, wherein:
the sense circuitry is configured to sense a frame of data, the frame of data including a two-dimensional array of touch data sensed during the touch scan and two one-dimensional arrays of stylus data sensed during the stylus scan,
the two-dimensional array of touch data includes no more than one measurement per location in the two dimensional array,
each one-dimensional array of stylus data includes no more than one measurement per location in each one-dimensional array,
the touch data used to identify the first characteristic of the first noise is from the frame of data,
the stylus data used to calculate the second characteristic of the first noise and the one or more characteristics of the second noise is from the frame of data.

3. The electronic device of claim 2, wherein:
the sense circuitry is configured to sense a plurality of frames of data including the frame of data, and
the frame of data does not include data from any other frames of data of the plurality of frames of data.

4. The electronic device of claim 1, wherein:
the one or more processors are further configured to detect, based on the stylus data, a coarse location of the stylus,
the touch data used to identify the first characteristic of the first noise does not include touch data corresponding to the coarse location of the stylus, and
the stylus data used to calculate the second characteristic of the first noise and the one or more characteristics of the second noise does not include stylus data corresponding to the coarse location of the stylus.

5. The electronic device of claim 4, wherein the one or more processors are further configured to:
after removing the first noise and the second noise from the stylus data, determining a fine location of the stylus based on the stylus data with the first noise and second noise removed.

6. The electronic device of claim 1, further comprising a display, wherein:
the first noise is noise caused by a conductive object touching the touch screen while the stylus touches the touch screen,
the first characteristic of the first noise is a profile of the first noise,
the second characteristic of the first noise is a scalar gain of the first noise,
the second noise is noise caused by the display, and
the one or more characteristics of the second noise are coefficients of an equation modeling the second noise.

7. The electronic device of claim 1, wherein the one or more processors are further configured to:

before calculating the second characteristic of the first noise and the one or more characteristics of the second noise, de-phase the stylus data.

8. The electronic device of claim 1, wherein the second characteristic of the first noise and the one or more characteristics of the second noise are calculated simultaneously using a system of equations.

9. The electronic device of claim 1, wherein
the touch electrodes include first touch electrodes and second touch electrodes,
the stylus data includes first stylus data sensed using the first touch electrodes and second stylus data sensed using the second touch electrodes,
the second characteristic of the first noise of included in the first stylus data and the one or more characteristics of the second noise included in the first stylus data are calculated using the first stylus data without using the second stylus data, and
the second characteristic of the first noise of included in the second stylus data and the one or more characteristics of the second noise included in the second stylus data are calculated using the second stylus data without using the first stylus data.

10. The electronic device of claim 9, wherein the one or more processors are further configured to:
in accordance with a determination that the calculation of the second characteristic of the first noise and the one or more characteristics of the second noise of the first stylus data fail to satisfy one or more criteria:
re-calculating the second characteristic of the first noise and the one or more characteristics of the second noise of the first stylus data using the first stylus data and the second stylus data.

11. A method, comprising:
at an electronic device including a touch screen that includes a plurality of touch electrodes, sense circuitry coupled to the plurality of touch electrodes, and one or more processors:
sensing, using the sense circuitry, touch data during a touch scan of the touch screen;
sensing, using the sense circuitry, stylus data during a stylus scan of the touch screen, wherein the stylus data includes a stylus signal, first noise, and second noise;
identifying a first characteristic of the first noise based on the touch data;
calculating a second characteristic of the first noise and one or more characteristics of the second noise based on the first characteristic of the first noise and the stylus data; and
removing the first noise and the second noise from the stylus data.

12. The method of claim 11, further comprising
sensing, with the sense circuitry, a frame of data, the frame of data including a two-dimensional array of touch data sensed during the touch scan and two one-dimensional arrays of stylus data sensed during the stylus scan, wherein:
the two-dimensional array of touch data includes no more than one measurement per location in the two dimensional array,
each one-dimensional array of stylus data includes no more than one measurement per location in each one-dimensional array,
the touch data used to identify the first characteristic of the first noise is from the frame of data,
the stylus data used to calculate the second characteristic of the first noise and the one or more characteristics of the second noise is from the frame of data.

13. The method of claim 12, further comprising:
sensing, with the sense circuitry, a plurality of frames of data including the frame of data, wherein:
the frame of data does not include data from any other frames of data of the plurality of frames of data.

14. The method of claim 11, further comprising:
detecting, based on the stylus data, a coarse location of the stylus, wherein:
the touch data used to identify the first characteristic of the first noise does not include touch data corresponding to the coarse location of the stylus, and
the stylus data used to calculate the second characteristic of the first noise and the one or more characteristics of the second noise does not include stylus data corresponding to the coarse location of the stylus.

15. The method of claim 14, further comprising:
after removing the first noise and the second noise from the stylus data, determining a fine location of the stylus based on the stylus data with the first noise and second noise removed.

16. The method of claim 11, wherein:
the electronic device further comprises a display,
the first noise is noise caused by a conductive object touching the touch screen while the stylus touches the touch screen,
the first characteristic of the first noise is a profile of the first noise,
the second characteristic of the first noise is a scalar gain of the first noise,
the second noise is noise caused by the display, and
the one or more characteristics of the second noise are coefficients of an equation modeling the second noise.

17. The method of claim 11, further comprising:
before calculating the second characteristic of the first noise and the one or more characteristics of the second noise, de-phasing the stylus data.

18. The method of claim 11, wherein the second characteristic of the first noise and the one or more characteristics of the second noise are calculated simultaneously using a system of equations.

19. The method of claim 11, wherein
the touch electrodes include first touch electrodes and second touch electrodes,
the stylus data includes first stylus data sensed using the first touch electrodes and second stylus data sensed using the second touch electrodes,
the second characteristic of the first noise of included in the first stylus data and the one or more characteristics of the second noise included in the first stylus data are calculated using the first stylus data without using the second stylus data, and
the second characteristic of the first noise of included in the second stylus data and the one or more characteristics of the second noise included in the second stylus data are calculated using the second stylus data without using the first stylus data.

20. The method of claim 19, further comprising:
in accordance with a determination that the calculation of the second characteristic of the first noise and the one or more characteristics of the second noise of the first stylus data fail to satisfy one or more criteria:
re-calculating the second characteristic of the first noise and the one or more characteristics of the second noise of the first stylus data using the first stylus data and the second stylus data.

21. A non-transitory computer-readable medium storing instructions, that when executed by one or more processors of an electronic device including a touch screen that includes a plurality of touch electrodes and sense circuitry coupled to the touch electrodes, causes the electronic device to perform a method comprising:
sensing, using the sense circuitry, touch data during a touch scan of the touch screen;
sensing, using the sense circuitry, stylus data during a stylus scan of the touch screen, wherein the stylus data includes a stylus signal, first noise, and second noise;
identifying a first characteristic of the first noise based on the touch data;
calculating a second characteristic of the first noise and one or more characteristics of the second noise based on the first characteristic of the first noise and the stylus data; and
removing the first noise and the second noise from the stylus data.

22. The non-transitory computer-readable medium of claim 21, wherein the method further comprises:
sensing, with the sense circuitry, a frame of data, the frame of data including a two-dimensional array of touch data sensed during the touch scan and two one-dimensional arrays of stylus data sensed during the stylus scan, wherein:
the two-dimensional array of touch data includes no more than one measurement per location in the two dimensional array,
each one-dimensional array of stylus data includes no more than one measurement per location in each one-dimensional array,
the touch data used to identify the first characteristic of the first noise is from the frame of data,
the stylus data used to calculate the second characteristic of the first noise and the one or more characteristics of the second noise is from the frame of data.

23. The non-transitory computer-readable medium of claim 21, wherein the method further comprises:
sensing, with the sense circuitry, a plurality of frames of data including the frame of data, wherein:
the frame of data does not include data from any other frames of data of the plurality of frames of data.

24. The non-transitory computer-readable medium of claim 21, wherein the method further comprises:
detecting, based on the stylus data, a coarse location of the stylus, wherein:
the touch data used to identify the first characteristic of the first noise does not include touch data corresponding to the coarse location of the stylus, and
the stylus data used to calculate the second characteristic of the first noise and the one or more characteristics of the second noise does not include stylus data corresponding to the coarse location of the stylus.

25. The non-transitory computer-readable medium of claim 24, wherein the method further comprises:
after removing the first noise and the second noise from the stylus data, determining a fine location of the stylus based on the stylus data with the first noise and the second noise removed.

26. The non-transitory computer-readable medium of claim 21, wherein:
the electronic device further comprises a display,
the first noise is noise caused by a conductive object touching the touch screen while the stylus touches the touch screen,
the first characteristic of the first noise is a profile of the first noise,
the second characteristic of the first noise is a scalar gain of the first noise,
the second noise is noise caused by the display, and
the one or more characteristics of the second noise are coefficients of an equation modeling the second noise.

27. The non-transitory computer-readable medium of claim 21, wherein the method further includes:
before calculating the second characteristic of the first noise and the one or more characteristics of the second noise, de-phasing the stylus data.

28. The non-transitory computer-readable medium of claim 21, wherein the second characteristic of the first noise and the one or more characteristics of the second noise are calculated simultaneously using a system of equations.

29. The non-transitory computer-readable medium of claim 21, wherein
the touch electrodes include first touch electrodes and second touch electrodes,
the stylus data includes first stylus data sensed using the first touch electrodes and second stylus data sensed using the second touch electrodes,
the second characteristic of the first noise of included in the first stylus data and the one or more characteristics of the second noise included in the first stylus data are calculated using the first stylus data without using the second stylus data, and
the second characteristic of the first noise of included in the second stylus data and the one or more characteristics of the second noise included in the second stylus data are calculated using the second stylus data without using the first stylus data.

30. The non-transitory computer-readable medium of claim 29, wherein the method further comprises:
in accordance with a determination that the calculation of the second characteristic of the first noise and the one or more characteristics of the second noise of the first stylus data fail to satisfy one or more criteria:
re-calculating the second characteristic of the first noise and the one or more characteristics of the second noise of the first stylus data using the first stylus data and the second stylus data.

* * * * *